US012046190B2

(12) United States Patent
Yamada

(10) Patent No.: US 12,046,190 B2
(45) Date of Patent: Jul. 23, 2024

(54) DATA RECEIVING CIRCUIT, DISPLAY DRIVER, AND DISPLAY APPARATUS

(71) Applicant: LAPIS TECHNOLOGY CO., LTD., Yokohama (JP)

(72) Inventor: Toshimi Yamada, Yokohama (JP)

(73) Assignee: Lapis Technology Co., Ltd., Yokohama (JP)

( * ) Notice: Subject to any disclaimer, the term of this patent is extended or adjusted under 35 U.S.C. 154(b) by 0 days.

(21) Appl. No.: 18/370,451

(22) Filed: Sep. 20, 2023

(65) Prior Publication Data

US 2024/0105109 A1 Mar. 28, 2024

(30) Foreign Application Priority Data

Sep. 28, 2022 (JP) ................................ 2022-154865

(51) Int. Cl.
*G09G 3/32* (2016.01)

(52) U.S. Cl.
CPC ......... *G09G 3/32* (2013.01); *G09G 2310/027* (2013.01); *G09G 2310/08* (2013.01); *G09G 2370/08* (2013.01)

(58) Field of Classification Search
CPC ............... G09G 3/32; G09G 2310/027; G09G 2310/08; G09G 2370/08
See application file for complete search history.

(56) References Cited

U.S. PATENT DOCUMENTS

| | | | | |
|---|---|---|---|---|
| 6,570,428 | B1 * | 5/2003 | Liao | G06F 1/10 327/158 |
| 7,260,736 | B2 * | 8/2007 | Zhang | G06F 1/10 713/503 |
| 2002/0122346 | A1 * | 9/2002 | Blodgett | G11C 5/063 365/233.1 |
| 2003/0174575 | A1 * | 9/2003 | Kono | G11C 11/4076 365/233.1 |
| 2004/0027167 | A1 * | 2/2004 | Mizumoto | H03M 9/00 326/93 |
| 2011/0161715 | A1 * | 6/2011 | Momoi | H03L 7/0805 713/401 |
| 2012/0288277 | A1 * | 11/2012 | Shin | H04J 3/14 398/45 |

FOREIGN PATENT DOCUMENTS

JP H08335670 A 12/1996

* cited by examiner

*Primary Examiner* — Jonathan A Boyd
(74) *Attorney, Agent, or Firm* — Volentine, Whitt & Francos, PLLC

(57) ABSTRACT

A data receiving circuit includes a clock generation circuit, a skew adjustment circuit, a leading edge detecting circuit, and a control circuit. The clock generation circuit generates a clock signal and a decision clock signal transitioning from a second level to a first level at a time point advancing by a time of ½ of the bit cycle with respect to the clock signal, according to the received reference clock signal. The skew adjustment circuit generates a skew adjustment data signal by delaying the received data signal through a delay circuit. The leading edge detecting circuit detects a leading edge of one bit of the skew adjustment data signal to generate a leading edge detection signal. The control circuit controls the delay time of the delay circuit based on the decision clock signal and the leading edge detection signal.

6 Claims, 10 Drawing Sheets

DATA RECEIVING CIRCUIT, DISPLAY DRIVER, AND DISPLAY APPARATUS

CROSS-REFERENCE TO RELATED APPLICATION

This application is based upon and claims the benefit of priority from the prior Japanese Patent Application No. 2022-154865 filed on Sep. 28, 2022, the entire contents of which are incorporated herein by reference.

BACKGROUND

1. Technical Field

The disclosure relates to a data receiving circuit, in particular a data receiving circuit having a skew adjustment function for adjusting skew of a clock signal with respect to received data, a display driver including the data receiving circuit, and a display apparatus.

2. Description of the Related Art

In semiconductor integrated circuits, synchronization design for synchronizing received data with a clock signal to perform various kinds of processing is applied.

In order to handle recent high-speed data processing, a semiconductor integrated circuit in which a skew amount of a clock signal with respect to data signal can be adjusted so as to ensure a setup time and a hold time of a flip-flop (hereinafter referred to as FF) is proposed (for example, see JP-A-8-335670).

The semiconductor integrated circuit disclosed in JP-A-8-335670 adjusts a skew amount of a clock signal by employing a configuration in which load drive capability of a clock buffer can be changed by a control signal received at an external terminal.

SUMMARY

Thus, according to the configuration disclosed in JP-A-8-335670, it is required to perform the following skew adjustment process one by one with respect to a manufactured semiconductor integrated circuit at its test stage before product shipment.

First, an LSI tester connected to the semiconductor integrated circuit is used to verify whether or not the semiconductor integrated circuit operates normally while supplying the above-described external terminal with a control signal designating a gradual change in the load drive capability of the buffer. Then, after removing the LSI tester from the semiconductor integrated circuit, a test operator performs work of supplying the above-described external terminal with a signal designating the load drive capability when the semiconductor integrated circuit has operated normally in the above-described verification.

Thus, there are problems that labor cost for the test increases, and since the skew adjustment process as described above must be performed one by one with respect to the manufactured semiconductor integrated circuit, it takes time before shipping products.

It is an object of the disclosure to provide a data receiving circuit, a display driver, and a display apparatus that can shorten the time spent on the test before product shipment, particularly for a clock skew adjustment, and can reduce the cost for the test.

A data receiving circuit according to the disclosure receives a reference clock signal and a data signal including a serial bit sequence with a predetermined bit cycle. The data receiving circuit includes a clock generation circuit, a skew adjustment circuit, a leading edge portion detecting circuit, and a control circuit. The clock generation circuit generates a clock signal transitioning from a state of a first level to a state of a second level within the bit cycle of one bit in the bit sequence included in the received data signal and generates a decision clock signal transitioning from the state of the second level to the state of the first level at a time point advancing by a time of ½ of the bit cycle with respect to the clock signal, according to the received reference clock signal. The skew adjustment circuit includes a delay circuit configured to change a delay time. The skew adjustment circuit generates a skew adjustment data signal where skew relative to the clock signal is adjusted by delaying the received data signal through the delay circuit. The leading edge portion detecting circuit detects a leading edge portion of the one bit included in the skew adjustment data signal. The leading edge portion detecting circuit generates a leading edge portion detection signal that transitions from the state of the first level to the state of the second level at a time point of the leading edge portion. The control circuit determines that the clock signal is in a state of a phase lead and increases the delay time of the delay circuit when both the decision clock signal and the leading edge portion detection signal are in the first level and determines that the clock signal is in a state of a phase lag and decreases the delay time of the delay circuit when both the decision clock signal and the leading edge portion detection signal are in the second level.

A display driver according to the disclosure drives a display panel having a plurality of display cells based on a video signal. The display driver includes a data receiving circuit and a DA conversion output unit. The data receiving circuit receives a reference clock signal and a video data signal including a serial bit sequence with a predetermined bit cycle. The data receiving circuit outputting a series of pixel data pieces constituted of parallel data each having a predetermined number of bits. The DA conversion output unit converts each of the pixel data pieces into a plurality of driving signals having voltages corresponding to luminance levels to output the plurality of driving signals to the display panel. The data receiving circuit includes a clock generation circuit, a skew adjustment circuit, a leading edge portion detecting circuit, and a control circuit. The clock generation circuit generates a clock signal transitioning from a state of a first level to a state of a second level within the bit cycle of one bit in the bit sequence included in the received video data signal and generates a decision clock signal transitioning from the state of the second level to the state of the first level at a time point advancing by a time of ½ of the bit cycle with respect to the clock signal, according to the received reference clock signal. The skew adjustment circuit includes a delay circuit configured to change a delay time. The skew adjustment circuit generates a skew adjustment data signal where skew relative to the clock signal is adjusted by delaying the received video data signal through the delay circuit. The leading edge portion detecting circuit detects a leading edge portion of the one bit included in the skew adjustment data signal. The leading edge portion detecting circuit generates a leading edge portion detection signal that transitions from the state of the first level to the state of the second level at a time point of the leading edge portion. The control circuit determines that the clock signal is in a state of a phase lead and increases the delay time of the delay circuit when both the decision clock signal and the leading edge portion detection signal are in the first level and determines that the clock signal is in a state of a phase lag and decreases the delay time of the delay circuit when both the decision clock signal and the leading edge portion detection signal are in the second level.

A display apparatus according to the disclosure includes a display panel and a display driver. The display panel has a plurality of display cells. The display driver drives the display panel based on a video signal. The display driver includes a data receiving circuit and a DA conversion output unit. The data receiving circuit receives a reference clock signal and a video data signal including a serial bit sequence with a predetermined bit cycle. The data receiving circuit outputs a series of pixel data pieces constituted of parallel data each having a predetermined number of bits. The DA conversion output unit converts each of the pixel data pieces into a plurality of driving signals having voltages corresponding to luminance levels to output them to the display panel. The data receiving circuit includes a clock generation circuit, a skew adjustment circuit, a leading edge portion detecting circuit, and a control circuit. The clock generation circuit generates a clock signal transitioning from a state of a first level to a state of a second level within the bit cycle of one bit in the bit sequence included in the received video data signal and generates a decision clock signal transitioning from the state of the second level to the state of the first level at a time point advancing by a time of ½ of the bit cycle with respect to the clock signal, according to the received reference clock signal. The skew adjustment circuit includes a delay circuit configured to change a delay time. The skew adjustment circuit generates a skew adjustment data signal where skew relative to the clock signal is adjusted by delaying the received video data signal through the delay circuit. The leading edge portion detecting circuit detects a leading edge portion of the one bit included in the skew adjustment data signal. The leading edge portion detecting circuit generates a leading edge portion detection signal that transitions from the state of the first level to the state of the second level at a time point of the leading edge portion. The control circuit determines that the clock signal is in a state of a phase lead and increases the delay time of the delay circuit when both the decision clock signal and the leading edge portion detection signal are in the first level and determines that the clock signal is in a state of a phase lag and decreases the delay time of the delay circuit when both the decision clock signal and the leading edge portion detection signal are in the second level.

BRIEF DESCRIPTION OF THE DRAWINGS

Features of the disclosure will be described below with reference to the accompanying drawings.

DETAILED DESCRIPTION

In the disclosure, the skew adjustment in which a phase of a clock signal with respect to a data signal is made proper is performed by determining whether a phase lag or a phase lead is occurring in the clock signal for synchronizing the received data signal and adjusting a delay time applied to the data signal based on the determination result.

Therefore, according to the disclosure, since the skew adjustment is completed without intervention of a worker in the test before the product shipment, it is possible to reduce the cost and time required for the test.

Figure 1:
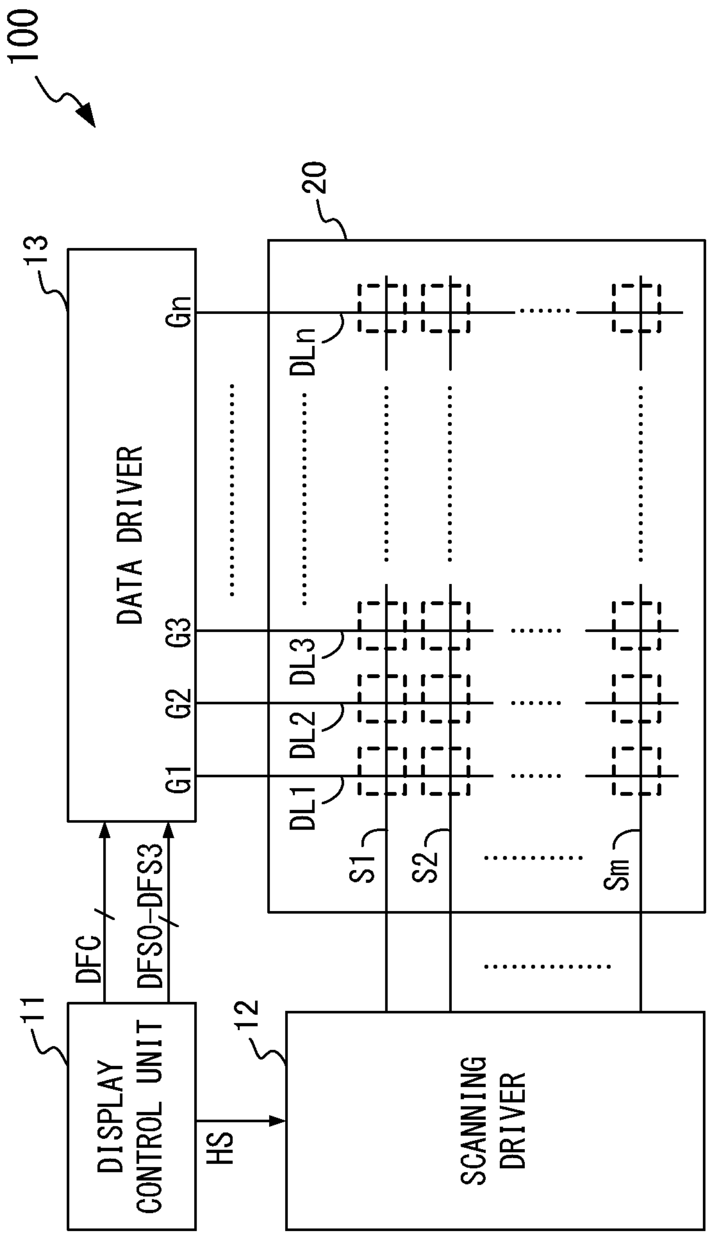
FIG. 1 is a block diagram illustrating a schematic configuration of a display apparatus 100 including a data receiving circuit according to the disclosure.

FIG. 1 is a block diagram illustrating a schematic configuration of a display apparatus 100 including a data receiving circuit according to the disclosure.

As illustrated in FIG. 1, the display apparatus 100 includes a display control unit 11, a scanning driver 12, a data driver 13, and a display panel 20 including a liquid crystal panel and the like.

The display panel 20 is formed with m (m is an integer equal to or more than 2) scanning lines S1 to Sm each extending in a horizontal direction of a two-dimensional screen and n (n is an integer equal to or more than 2) data lines DL1 to DLn each extending in a perpendicular direction of the two-dimensional screen. Furthermore, a display cells serving as pixels are formed in regions of respective intersection portions of the scanning lines and the data lines.

The display control unit 11 generates a horizontal scanning signal HS indicating a horizontal scanning timing for each horizontal synchronization signal included in an input video signal and supplies it to the scanning driver 12.

Further, based on the input video signal, the display control unit 11 generates a series of pixel data pieces PD representing a luminance level of a pixel with, for example, 7 bits for each pixel. Then, the display control unit 11 generates a signal group that complies with a Low Voltage Differential Signaling (LVDS) standard based on the series of pixel data pieces PD. That is, the display control unit 11, first, divides the series of pixel data pieces PD described above into four-system data series in a serial form, converts each of them into a form of a differential signal to generate first to fourth differential serial data signals DFS0 to DFS3. Furthermore, the display control unit 11 generates a differential clock signal DFC by converting a reference clock signal having a cycle of a serial data signal for one pixel data piece PD into a differential signal. Then, the display control unit 11 transmits the differential clock signal DFC and the four-system differential serial data signals DFS0 to DFS3 to the data driver 13.

The scanning driver 12 generates a horizontal scanning pulse having a predetermined peak voltage in synchronization with the horizontal scanning signal HS, and sequentially and alternatively applies it to each of the scanning lines S1 to Sm of the display panel 20.

The data driver 13 receives the differential serial data signals DFS0 to DFS3 and the differential clock signal DFC. Based on the differential serial data signals DFS0 to DFS3 and the differential clock signal DFC, the data driver 13 generates analog driving signals G1 to Gn respectively corresponding to the data lines DL1 to DLn of the display panel 20 and supplies them to the data lines DL1 to DLn of the display panel 20.

Figure 2:
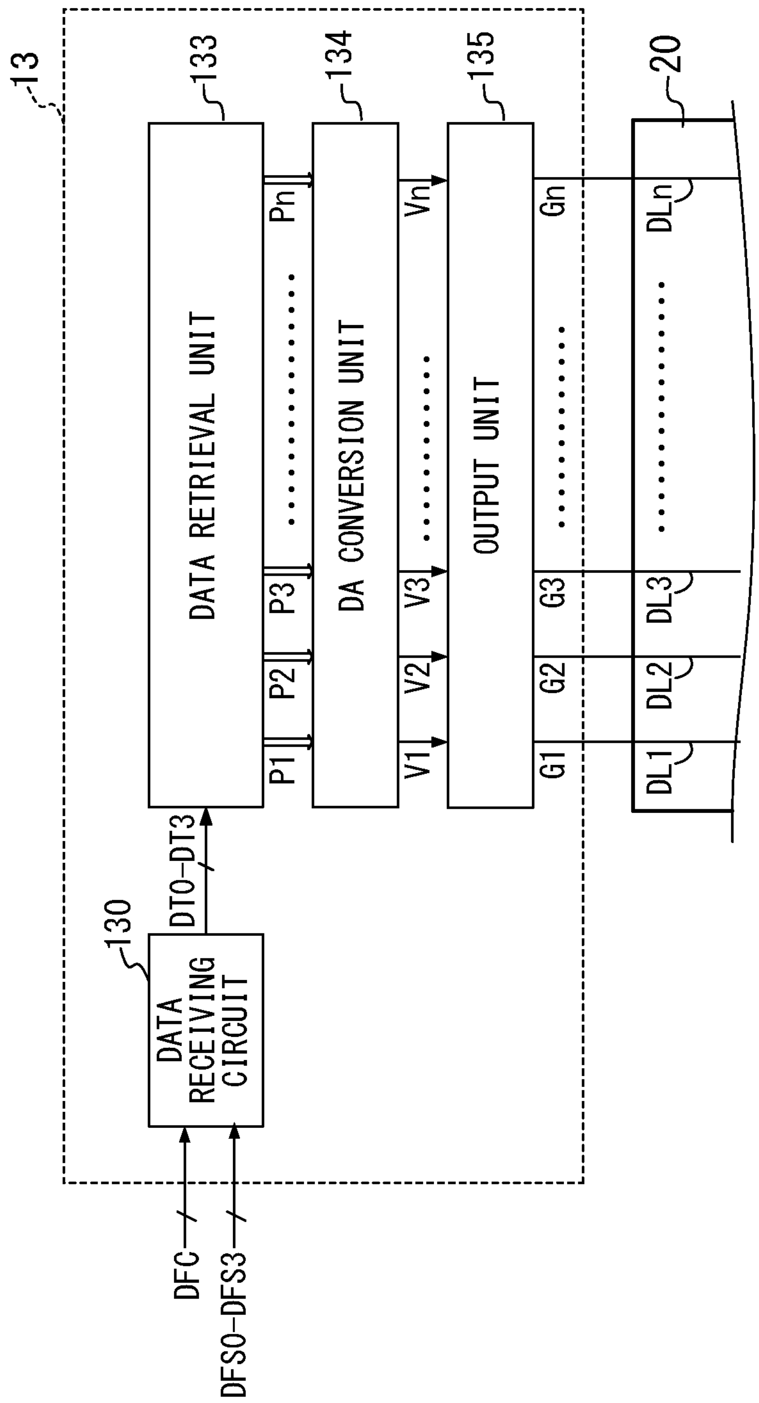
FIG. 2 is a block diagram illustrating an internal configuration of a data driver 13.

FIG. 2 is a block diagram illustrating an internal configuration of the data driver 13.

The data driver 13 is formed on a semiconductor chip as a semiconductor device and includes a data receiving circuit 130, a data retrieval unit 133, a DA conversion unit 134, and an output unit 135 according to the disclosure.

The data receiving circuit 130 cancels the differential signal form of each of the received four-system differential serial data signals DFS0 to DFS3 and differential clock signal DFC to restore first to fourth serial data signals and the reference clock signal. Next, based on the restored reference clock signal, the data receiving circuit 130 generates a clock signal for synchronizing the restored serial data signal and delays the serial data signal to adjust the skew of the clock signal with respect to the serial data signal.

Next, by performing serial-parallel conversion processing on each of the skew-adjusted first to fourth serial data signals in synchronization with the clock signal, the data receiving circuit 130 obtains four-system data signals DT0 to DT3 in a parallel form, each of which includes the series of pixel data pieces PD described above.

The data receiving circuit 130 supplies the data signals DT0 to DT3 to the data retrieval unit 133.

The data retrieval unit 133 retrieves n pixel data pieces PD corresponding to the scanning lines from the data signals DT0 to DT3 for each horizontal scanning period, and supplies each of them to the DA conversion unit 134 as pixel data pieces P1 to Pn. The DA conversion unit 134 converts the pixel data pieces P1 to Pn into driving signals V1 to Vn having voltage values corresponding to respective luminance levels and supplies the driving signals V1 to Vn to the output unit 135. The output unit 135 amplifies each of the driving signals V1 to Vn as desired to obtain the driving signals G1 to Gn and applies each of them to the data lines D1 to Dn of the display panel 20.

The internal configuration of the data receiving circuit 130 illustrated in FIG. 2 will be described below.

Figure 3:
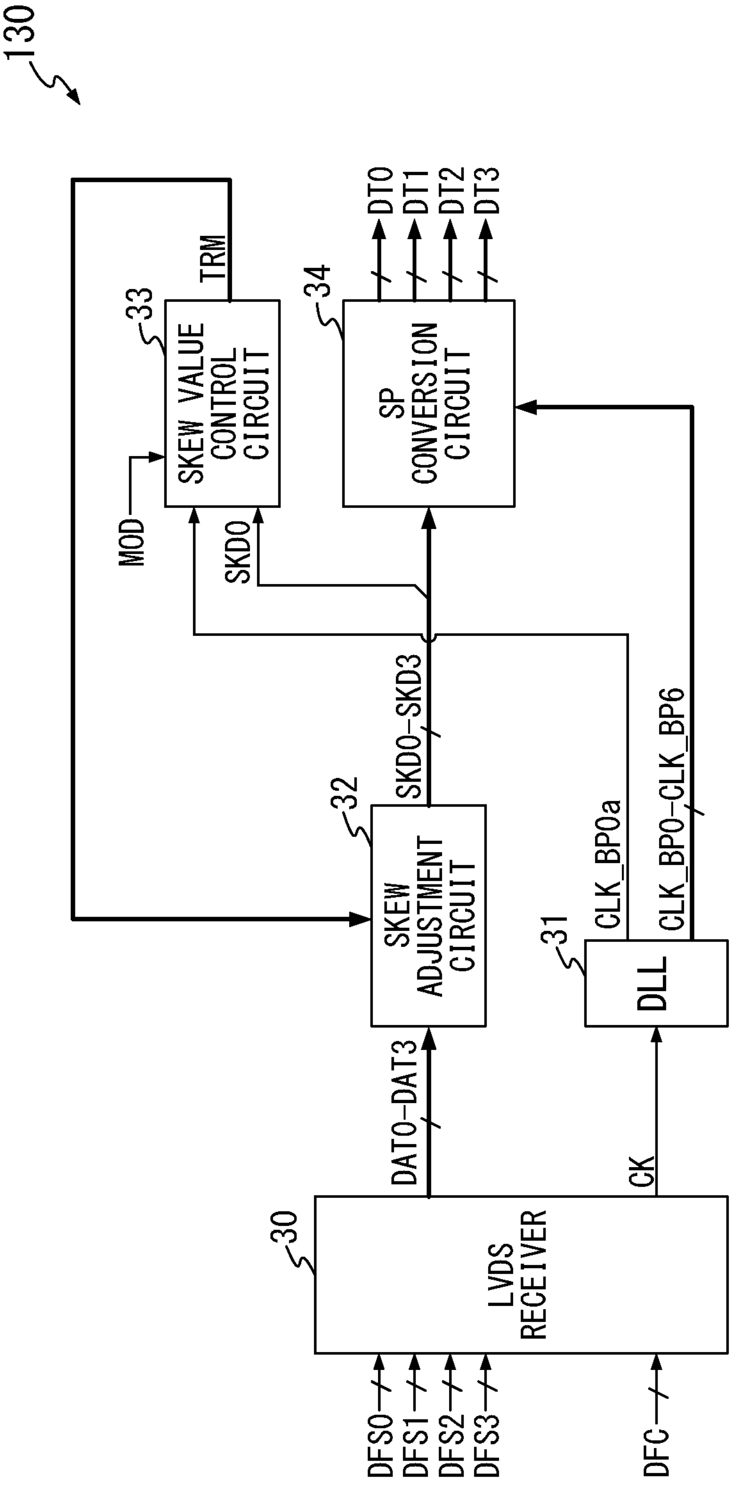
FIG. 3 is a block diagram illustrating an internal configuration of a data receiving circuit 130.
Figure 4:
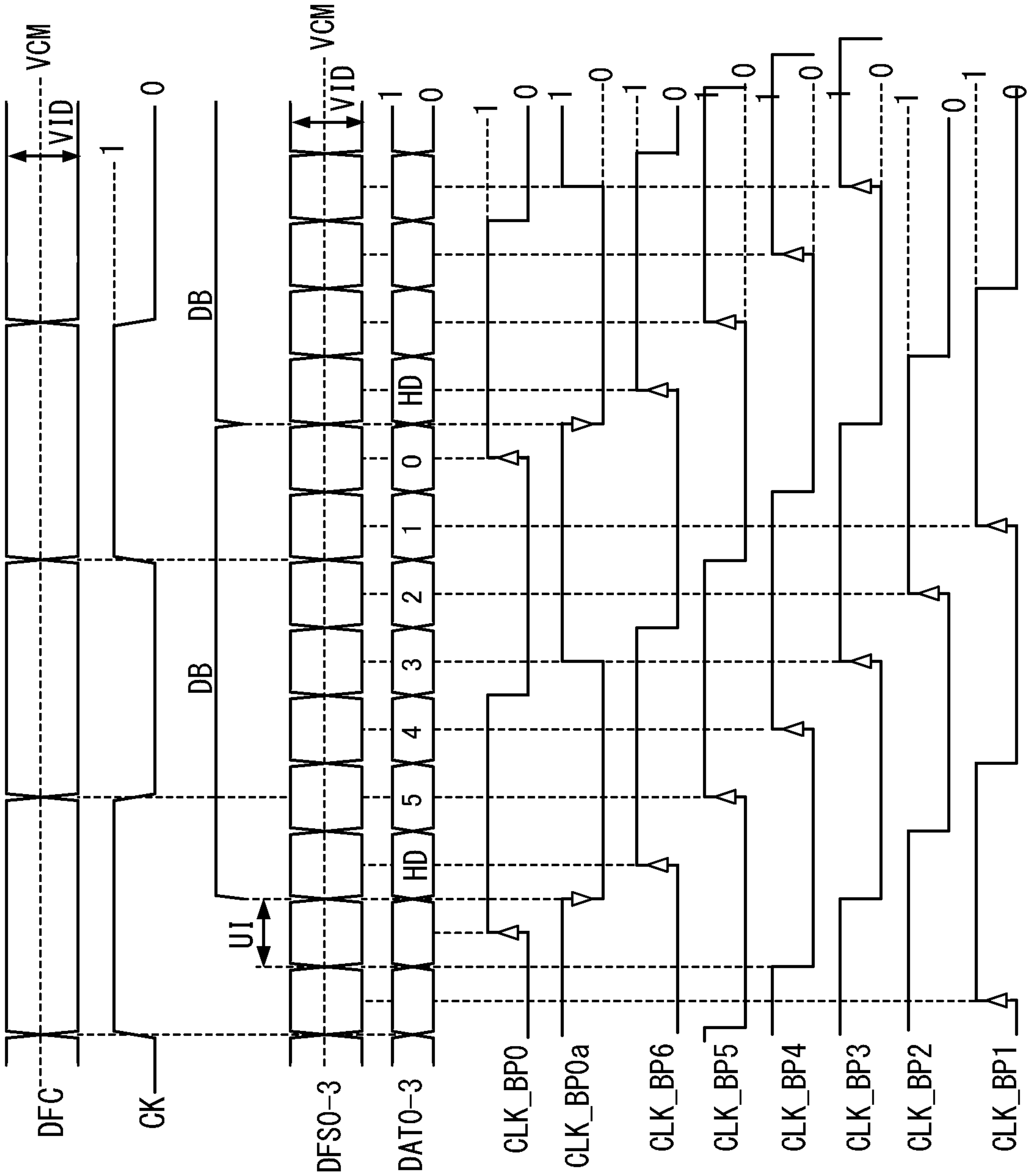
FIG. 4 is a timing chart illustrating waveforms of a signal group generated inside the data receiving circuit 130.

FIG. 3 is a block diagram illustrating a configuration of the data receiving circuit 130, and FIG. 4 is a timing chart illustrating a part of waveform trains of a signal group generated inside the data receiving circuit 130.

As illustrated in FIG. 3, the data receiving circuit 130 includes an LVDS receiver 30, a Delay Locked Loop (DLL) 31, a skew adjustment circuit 32, a skew value control circuit 33, and a serial-parallel (SP) conversion circuit 34.

The LVDS receiver 30 receives the differential clock signal DFC and the four-system differential serial data signals DFS0 to DFS3, which are supplied from the display control unit 11 and each have an amplitude VID whose level rise and fall with a common voltage VCM as a center as illustrated in FIG. 4. By cancelling the differential signal form of each of the received differential serial data signals DFS0 to DFS3, the LVDS receiver 30 generates binary (0, 1) serial data signals DAT0 to DAT3 as each of them being illustrated in FIG. 4. As illustrated in FIG. 4, in each of the serial data signals DAT0 to DAT3, a data block DB corresponding to one pixel data piece PD is represented by a 7-bit serial bit sequence with a bit cycle UI including a head bit HD.

Furthermore, as illustrated in FIG. 4, the LVDS receiver 30 restores a binary (0, 1) reference clock signal CK having a cycle equal to the cycle of the data block DB by canceling the differential signal form of the received differential clock signal DFC.

The LVDS receiver 30 supplies the restored four-system serial data signals DAT0 to DAT3 to the skew adjustment circuit 32 and supplies the reference clock signal CK to the DLL 31.

As illustrated in FIG. 4, by delaying the phase of the reference clock signal CK by 1.5 UI, the DLL 31 generates a clock signal CLK_BP0 that rises from a logic level 0 to a logic level 1 at a time point of ½ of a bit cycle UI in the last bit (0-th bit) of each data block DB.

As illustrated in FIG. 4, by delaying the reference clock signal CK by (2·UI) and inverting its phase, the DLL 31 generates a clock signal that falls from the logic level 1 to the logic level 0 at a time point of a leading edge portion of the head bit HD of each data block DB as a decision clock signal CLK_BP0*a*.

As illustrated in FIG. 4, by delaying the clock signal CLK_BP0 by the bit cycle UI, the DLL 31 generates a clock signal CLK_BP6 that rises from the logic level 0 to the logic level 1 at the center time point (UI/2) of the head bit HD of each data block DB. As illustrated in FIG. 4, by delaying the clock signal CLK_BP6 by the bit cycle UI, the DLL 31 generates a clock signal CLK_BP5 that rises from the logic level 0 to the logic level 1 at the center time point (UI/2) of a 5-th bit following the head bit HD. As illustrated in FIG. 4, by delaying the clock signal CLK_BP5 by the bit cycle UI, the DLL 31 generates a clock signal CLK_BP4 that rises from the logic level 0 to the logic level 1 at the center time point (UI/2) of a fourth bit following the 5-th bit of each data block DB. As illustrated in FIG. 4, by delaying the clock signal CLK_BP4 by the bit cycle UI, the DLL 31 generates a clock signal CLK_BP3 that rises from the logic level 0 to the logic level 1 at the center time point (UI/2) of a third bit following the fourth bit of each data block DB. As illustrated in FIG. 4, by delaying the clock signal CLK_BP3 by the bit cycle UI, the DLL 31 generates a clock signal CLK_BP2 that rises from the logic level 0 to the logic level 1 at the center time point (UI/2) of a second bit following the third bit of each data block DB. As illustrated in FIG. 4, by delaying the clock signal CLK_BP2 by the bit cycle UI, the DLL 31 generates a clock signal CLK_BP1 that rises from the logic level 0 to the logic level 1 at the center time point (UI/2) of a first bit following the second bit of each data block DB.

The DLL 31 supplies the decision clock signal CLK_BP0*a* generated as described above to the skew value control circuit 33 and supplies the generated seven-system clock signals CLK_BP0 to CLK_BP6 to the SP conversion circuit 34.

The skew adjustment circuit 32 individually receives the four-system serial data signals DAT0 to DAT3 together with a trimming signal TRM supplied from the skew value control circuit 33. First, the skew adjustment circuit 32 selects one delay time among 0-th to 7-th delay times having different time lengths based on the trimming signal TRM. Then, the skew adjustment circuit 32 outputs each of the serial data signals DAT0 to DAT3 after a lapse of the one delay time selected as described above and supplies them to the SP conversion circuit 34 as skew adjustment data signals SKD0 to SKD3 to which skew adjustment is performed.

The skew value control circuit 33 performs the following operations when a skew adjustment mode signal MOD is received.

Based on the decision clock signal CLK_BP0*a* and the skew adjustment data signal SKD0, the skew value control circuit 33 determines whether the phases of the clock signals CLK_BP0 to CLK_BP6 are lagging phases or leading phases with respect to the center time point (UI/2) of each bit of the data block DB. Here, when it is determined to be the lagging phase, the skew value control circuit 33 generates the trimming signal TRM for selecting a delay time that is one step shorter than a current delay time in order to advance the phase of each clock signal by one step and supplies the trimming signal TRM to the skew adjustment circuit 32. When it is determined to the leading phase, the skew value control circuit 33 generates the trimming signal TRM for selecting a delay time that is one step longer than the current delay time in order to delay the phase of each clock signal by one step and supplies the trimming signal TRM to the skew adjustment circuit 32.

The SP conversion circuit 34 includes four-system conversion circuits that individually receive the skew adjustment data signals SKD0 to SKD3. In the SP conversion circuit 34, based on the clock signal CLK_BP0 to CLK_BP6, the four-system conversion circuits convert each of the skew adjustment data signals SKD0 to SKD3 in the serial signal form into the data signals DT0 to DT3 each being constituted of 7-bit parallel data and output them.

Figure 5:
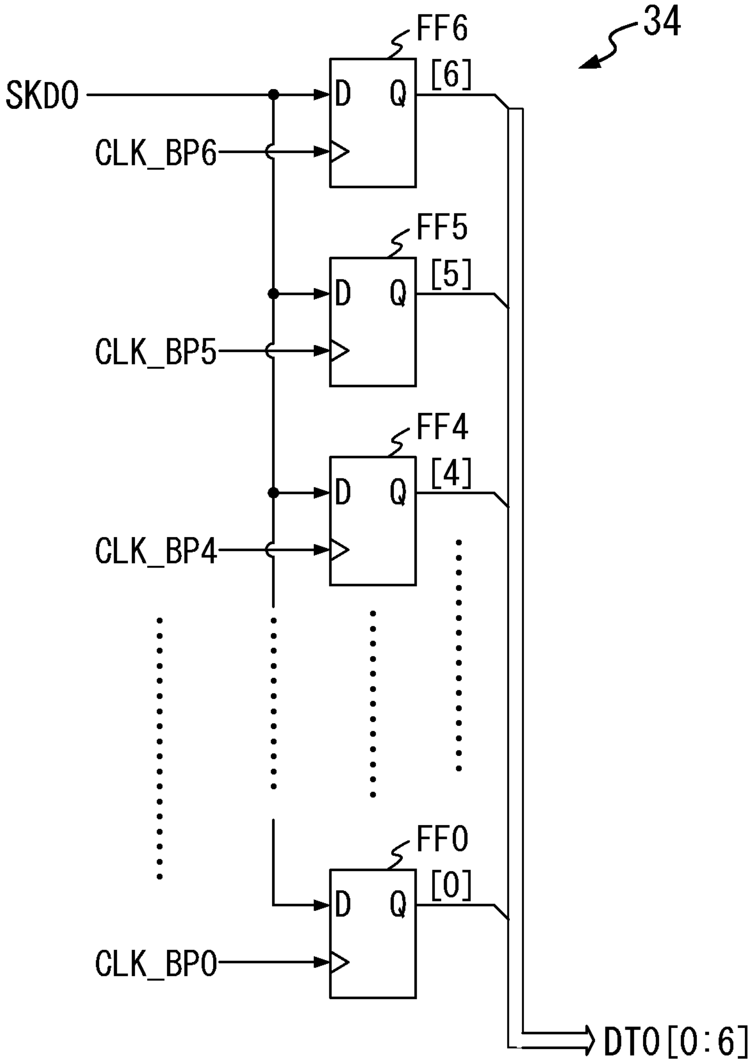
FIG. 5 is a circuit diagram illustrating a conversion circuit that performs SP conversion of a skew adjustment data signal SKD0.

FIG. 5 is a circuit diagram illustrating a conversion circuit that performs SP conversion of the skew adjustment data signal SKD0 extracted from among the four-system conversion circuits included in the SP conversion circuit 34.

As illustrated in FIG. 5, this conversion circuit includes D flip-flops FF0 to FF6 each receiving the skew adjustment data signal SKD0 at its D terminal.

The D flip-flop FF6 receives the clock signal CLK_BP6 illustrated in FIG. 4 at its clock terminal, retrieves the head bit HD in the data block DB at a timing of its rising edge thereof and outputs it as a bit [6] of the data signal DT0. The D flip-flop FF5 receives the clock signal CLK_BP5 illustrated in FIG. 4 at its clock terminal, retrieves the 5-th bit in the data block DB at a timing of a rising edge thereof and outputs it as a bit [5] of the data signal DT0. Similarly, the D flip-flops FF4 to FF0 retrieve 4-th to 0-th bits in the data block DB at timings of rising edges of the clock signals CLK_BP4 to CLK_BP0 that have been received at respective clock terminals and output them as bits [4] to [0] of the data signal DT0, respectively.

Next, the skew adjustment circuit 32 and the skew value control circuit 33 illustrated in FIG. 3 will be described in more detail.

Figure 6:
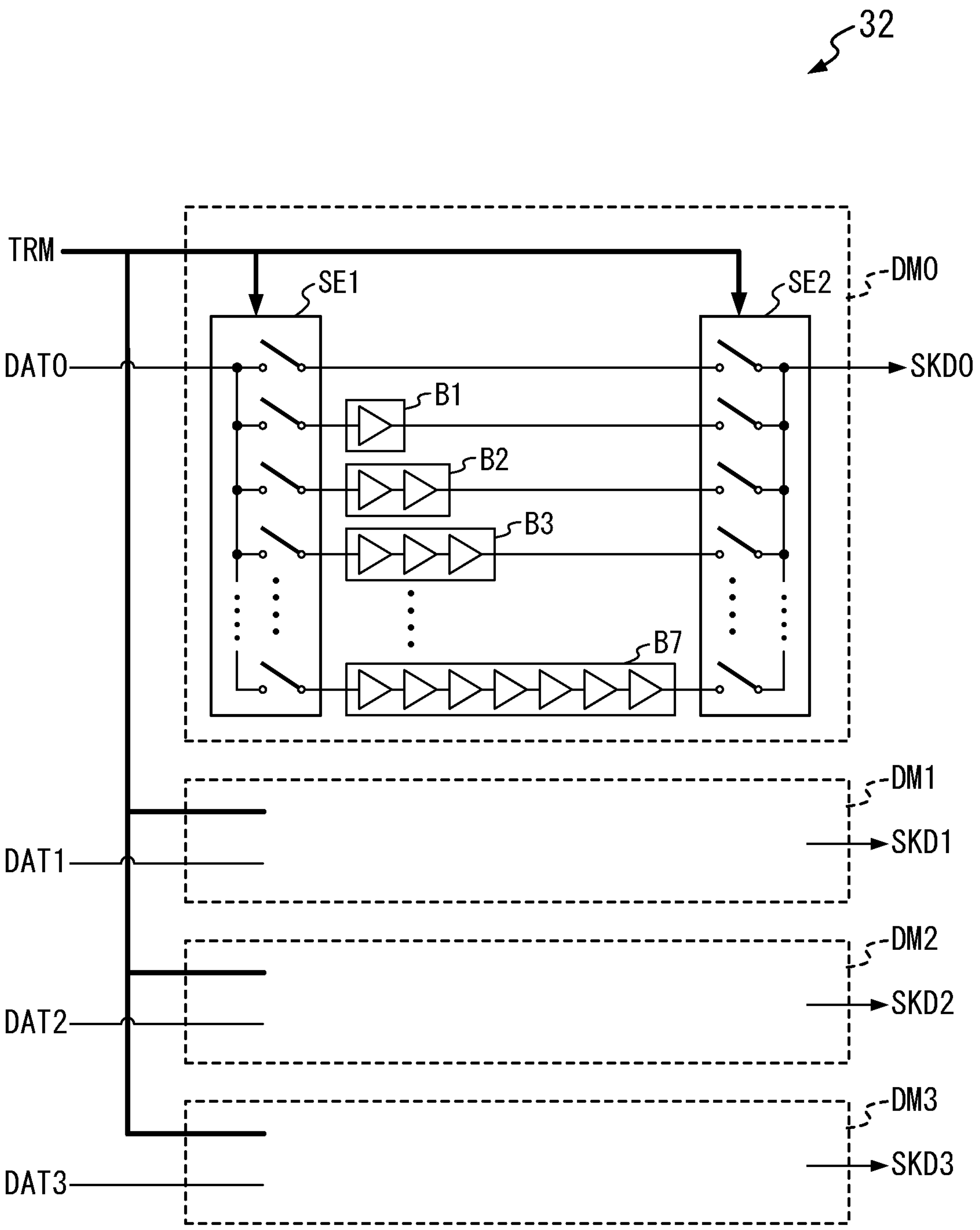
FIG. 6 is a circuit diagram illustrating a configuration of a skew adjustment circuit 32.

FIG. 6 is a circuit diagram illustrating one example of a configuration of the skew adjustment circuit 32.

As illustrated in FIG. 6, the skew adjustment circuit 32 includes four-system skew adjustment modules DM0 to DM3 that individually receive the serial data signals DAT0 to DAT3 supplied from the LVDS receiver 30.

The skew adjustment modules DM0 to DM3 have the same configuration, that is, as illustrated in FIG. 6, delay selectors SE1 and SE2 and delay circuits B1 to B7 and perform the same operation based on the trimming signal TRM.

In the following, the skew adjustment module DM0 is extracted, and the configuration and operations thereof will be described.

The delay circuits B1 to B7 each have a different number of buffers connected in series, and the delay times required for the input signal to be output are set, for example, in the following magnitude relationship according to the number of series stages of the buffers.

A delay time of B1<a delay time of B2< . . . <a delay time of B7

The delay selectors SE1 and SE2 operate according to and in conjunction with the trimming signal TRM to select any one of the following 0-th to 7th delay paths obtaining the 0-th to 7th delay time described above. Then, the delay selector SE1 inputs the serial data signal DAT0 (DAT1 to DAT3) to one selected delay path, and a signal output through this delay path is output from the delay selector SE2 as the skew adjustment data signal SKD0.

A 0-th delay path: SE1, SE2
A 1-st delay path: SE1, B1, SE2
A 2-nd delay path: SE1, B2, SE2
A 3-rd delay path: SE1, B3, SE2
A 4-th delay path: SE1, B4, SE2
A 5-th delay path: SE1, B5, SE2
A 6-th delay path: SE1, B6, SE2
A 7-th delay path: SE1, B7, SE2

The delay selectors SE1 and SE2 are, for example, in a state of selecting the 4-th delay path corresponding to the 4-th delay time, in an initial state immediately after manufacture.

Figure 7:
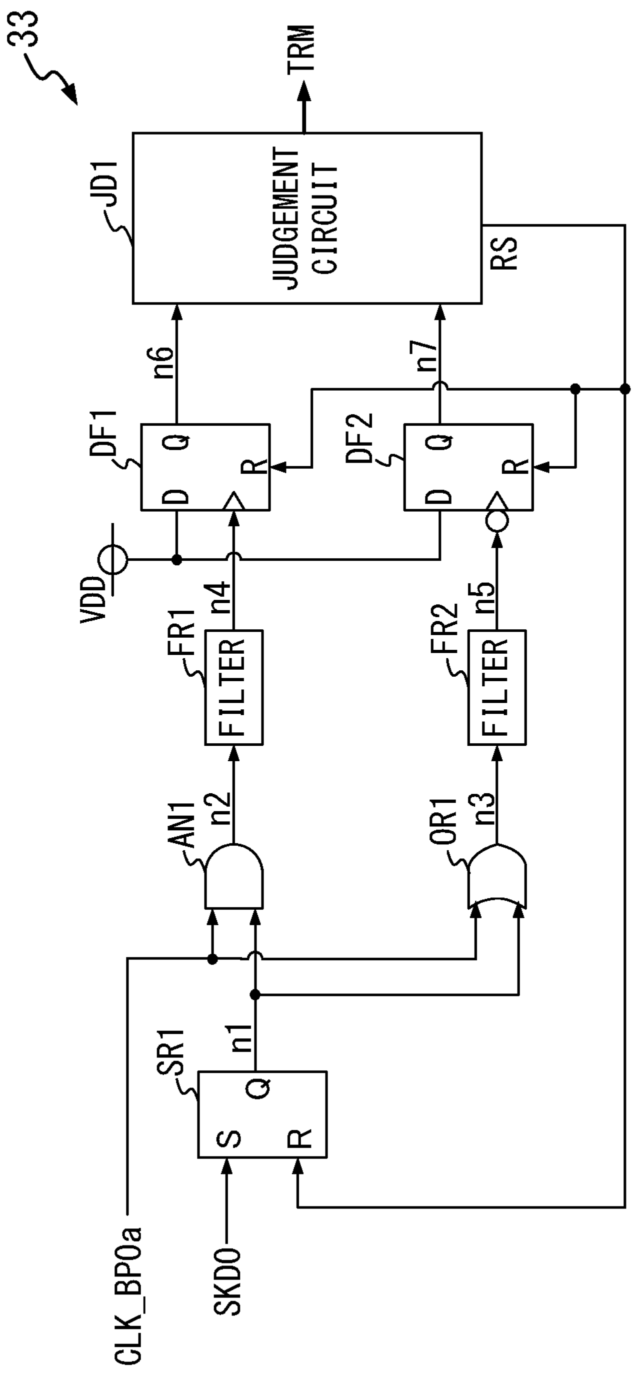
FIG. 7 is a circuit diagram illustrating a configuration of a skew value control circuit 33.

FIG. 7 is a circuit diagram illustrating a configuration of the skew value control circuit 33.

The skew value control circuit 33 includes an RS flip-flop SR1, an AND gate AN1, an OR gate OR1, filters FR1 and FR2, D flip-flops DF1 and DF2, and a judgement circuit JD1.

When the skew adjustment mode signal MOD is received, the skew value control circuit 33 operates the RS flip-flop SR1, the AND gate AN1, the OR gate OR1, the filters FR1 and FR2, the D flip-flops DF1 and DF2, and the judgement circuit JD1 as follows. In FIG. 7, illustration of the skew adjustment mode signal MOD is omitted.

The RS flip-flop SR1 receives the skew adjustment data signal SKD0 at its own set terminal S and receives a reset signal RS sent from the judgement circuit JD1 at its reset terminal R.

When the skew adjustment data signal SKD0 transitions from the logic level 0 to the logic level 1, the RS flip-flop SR1 supplies a leading edge portion detection signal n1 of the logic level 1 indicating that the leading edge portion of the head bit HD in the skew adjustment data signal SKD0 has been detected to a first input terminal of each of the AND gate AN1 and the OR gate OR1. When the reset signal RS of the logic level 1 is received, the RS flip-flop SR1 supplies the leading edge portion detection signal n1 of the logic level 0 to the first input terminal of each of the AND gate AN1 and the OR gate OR1.

The AND gate AN1 receives the leading edge portion detection signal n1 at its first input terminal and receives the decision clock signal CLK_BP0*a* at its second input terminal, and when both of them represent the logic level 1, the AND gate AN1 supplies a phase lag detection signal n2 of the logic level 1 indicating "with a phase lag" to the filter FR1. On the other hand, when any one of the leading edge portion detection signal n1 and the decision clock signal CLK_BP0*a* indicates the logic level 0, the AND gate AN1 supplies the phase lag detection signal n2 of the logic level 0 indicating "no phase lag" to the filter FR1.

The OR gate OR1 receives the leading edge portion detection signal n1 at its first input terminal and receives the decision clock signal CLK_BP0*a* at its second input terminal, and when both of them represent the logic level 0, the OR gate OR1 supplies a phase lead detection signal n3 of the logic level 0 indicating "with a phase lead" to the filter FR2. On the other hand, when one of the leading edge portion detection signal n1 and the decision clock signal CLK_BP0$a$, or both of them represent the logic level 1, the OR gate OR1 supplies a phase lead detection signal n3 of the logic level 1 indicating "no phase lead" to the filter FR2.

The filter FR1 is a low-pass filter and supplies the D flip-flop DF1 with a phase lag detection signal n4 from which high frequency whisker-shaped noise generated in the phase lag detection signal n2 output from the AND gate AN1 has been removed.

The filter FR2 is a low-pass filter and supplies the D flip-flop DF2 with a phase lead detection signal n5 from which high frequency whisker-shaped noise generated in the phase lead detection signal n3 output from the OR gate OR1 has been removed.

The D flip-flop DF1 receives the phase lag detection signal n4 at its clock terminal and receives a power supply voltage VDD at its D terminal. Furthermore, the D flip-flop DF1 receives the reset signal RS output from the judgement circuit JD1 at its reset terminal R.

When the reset signal RS of the logic level 1 has been received, the D flip-flop DF1 supplies a phase lag detection signal n6 of the logic level 0 indicating "no phase lag" to the judgement circuit JD1. While the phase lag detection signal n4 received at its own clock terminal maintains the state of the logic level 0, the D flip-flop DF1 supplies the phase lag detection signal n6 of the logic level 0 indicating "no phase lag" to the judgement circuit JD1.

Subsequently, when the phase lag detection signal n4 transitions from the logic level 0 to the logic level 1, the D flip-flop DF1 supplies the phase lag detection signal n6 of the logic level 1 indicating "with a phase lag" to the judgement circuit JD1.

The D flip-flop DF2 receives the phase lead detection signal n5 at its inverted clock terminal and receives the power supply voltage VDD at its D terminal. Furthermore, the D flip-flop DF2 receives the reset signal RS output from the judgement circuit JD1 at its reset terminal R.

When the reset signal RS of the logic level 1 has been received, the D flip-flop DF2 supplies a phase lead detection signal n7 of the logic level 0 indicating "no phase lead" to the judgement circuit JD1. While the phase lead detection signal n5 received at its own inverted clock terminal maintains the state of the logic level 1, the D flip-flop DF2 supplies the phase lead detection signal n7 of the logic level 0 indicating "no phase lead" to the judgement circuit JD1.

Subsequently, when the phase lead detection signal n5 transitions from the logic level 1 to the logic level 0, the D flip-flop DF2 supplies the phase lead detection signal n7 of the logic level 1 indicating "with a phase lead" to the judgement circuit JD1.

When the phase lag detection signal n6 indicating "with a phase lag" has been received, the judgement circuit JD1 supplies the skew adjustment circuit 32 with the trimming signal TRM for changing the delay time currently selected in the skew adjustment circuit 32 to a delay time shorter than the delay time by one step. On the other hand, when the phase lead detection signal n7 indicating "with a phase lead" has been received, the judgement circuit JD1 supplies the skew adjustment circuit 32 with the trimming signal TRM for changing the delay time currently selected in the skew adjustment circuit 32 to a delay time longer than the delay time by one step.

Furthermore, as illustrated in FIG. 4, for each data block DB, the judgement circuit JD1 supplies the reset signal RS to the reset terminals R of each of the RS flip-flop SR1 and the D flip-flops DF1 and DF2, for example, at the timing of the rising edge of the clock signal CLK_BP3.

For each data block DB illustrated in FIG. 4, the judgement circuit JD1 repeatedly performs the above-described processing until the phase lag detection signal n6 becomes a state indicating "no phase lag" while the phase lead detection signal n7 becomes a state indicating "no phase lead", that is, until the proper phase is achieved.

Here, according to skew adjustment mode signal MOD, the above-described operation by the skew value control circuit 33 is performed during a test of the data driver 13 before product shipment, during a blank period of a video signal at usual operation of the display apparatus 100, or the like.

For example, in the test before the product shipment, the skew adjustment mode signal MOD is supplied to the skew value control circuit 33 by a tester (not illustrated) to set the skew value control circuit 33 to an operation state. Further, by the tester, the differential serial data signal DFS0 in which the head bit HD becomes the logic level 1 and all of the other bits become the logic level 0 in the 7-bit serial bit sequence included in the data block DB and the differential clock signal DFC illustrated in FIG. 4 are supplied to the data driver 13.

In the following, the operation when the skew value control circuit 33 is operated by the execution of the above-described test will be described by dividing into a case where neither the phase lag nor the phase lead is occurring in the clock signal (proper phase), a case where the phase lag is occurring, and a case where the phase lead is occurring.

The proper phase means a state where the timing of the rising edge of each of the above-described clock signals CLK_BP0 to CLK_BP6 becomes equal to the center time point (UI/2) of each bit in the serial bit sequence of each of the serial data signal DAT0 to DAT3 as illustrated in FIG. 4. In this state of the proper phase, both the hold time and the setup time can be satisfied. On the other hand, the phase lead (lag) means a state where the timing of the rising edge of each of the above-described clock signals CLK_BP0 to CLK_BP6 is earlier (later) than the center time point (UI/2) of each bit. In this respect, in a state of the phase lag, the hold time of the flip-flop becomes insufficient, and in the phase lead state, the setup becomes insufficient, resulting in causing a possibility of malfunction.

Figure 8:
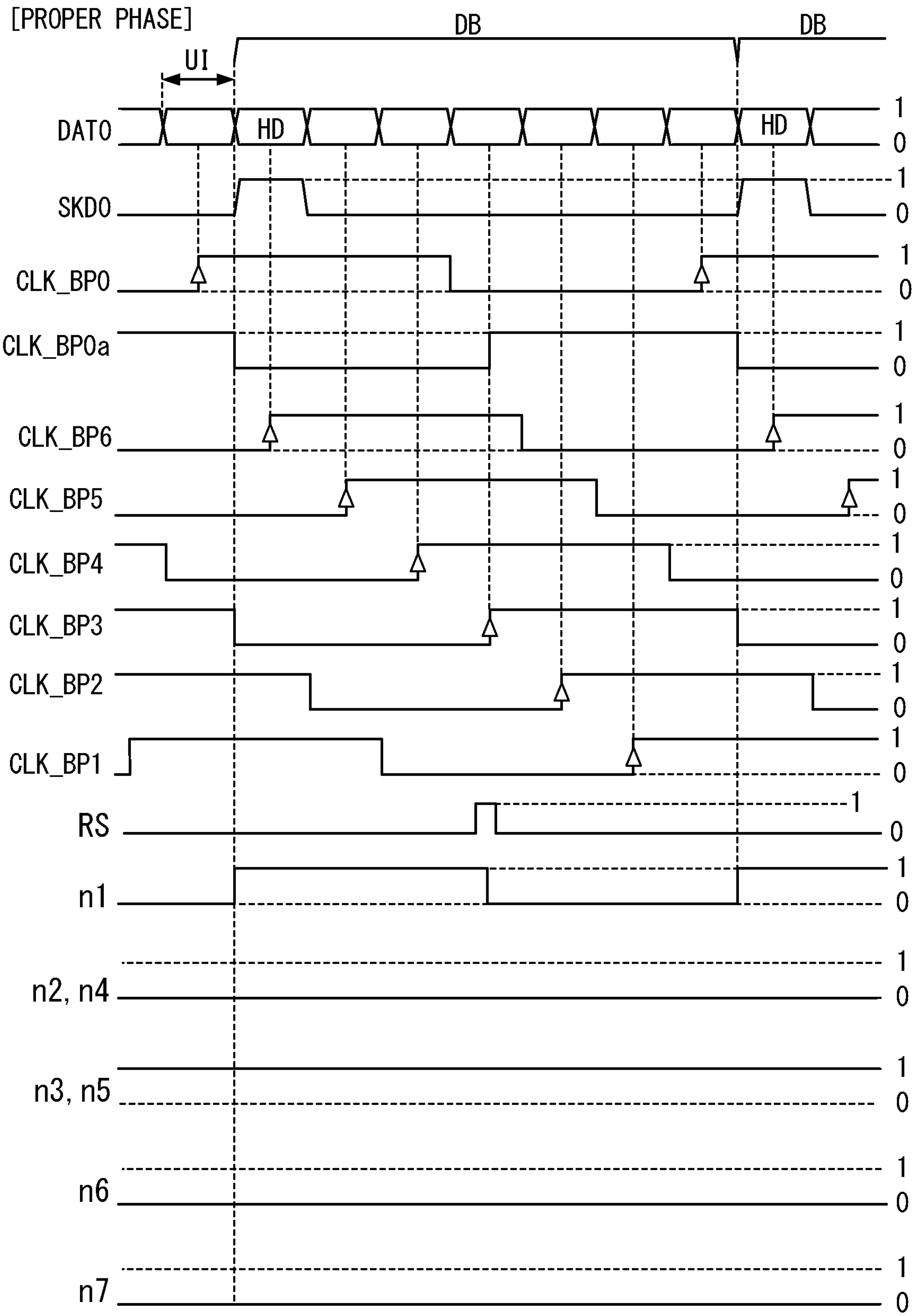
FIG. 8 is a timing chart illustrating an operation of the skew value control circuit 33 when a clock signal is in a state of a proper phase.

FIG. 8 is a timing chart illustrating the operation of the skew value control circuit 33 in a case where the clock signals CLK_BP0 to CLK_BP6 are in a state of the proper phase with respect to the serial data signal DAT0.

When in a state of the proper phase, as illustrated in FIG. 8, the timing of the rising edge of each of the above-described clock signals CLK_BP0 to CLK_BP6 is the center time point (UI/2) of each bit in the serial bit sequence [1, 0, 0, 0, 0, 0, 0] included in the data block DB of the skew adjustment data signal SKD0.

In this case, according to the head bit HD (logic level 1) of the data block DB of the skew adjustment data signal SKD0, first, the RS flip-flop SR1 outputs the leading edge portion detection signal n1 that transitions from the logic level 0 to the logic level 1. During this time period, as illustrated in FIG. 8, both the judgement clock signal CLK_BP0$a$ and the leading edge portion detection signal n1 are never at the identical logic level. Thus, as illustrated in FIG. 8, the phase lag detection signals n2, n4, and n6 maintain a state of the logic level 0 indicating "no phase lag." Further, the phase lead detection signals n3 and n5 maintain a state of the logic level 1 indicating "no phase lead," and the phase lead detection signal n7 maintains a state of the logic level 0 indicating "no phase lead."

Figure 9:
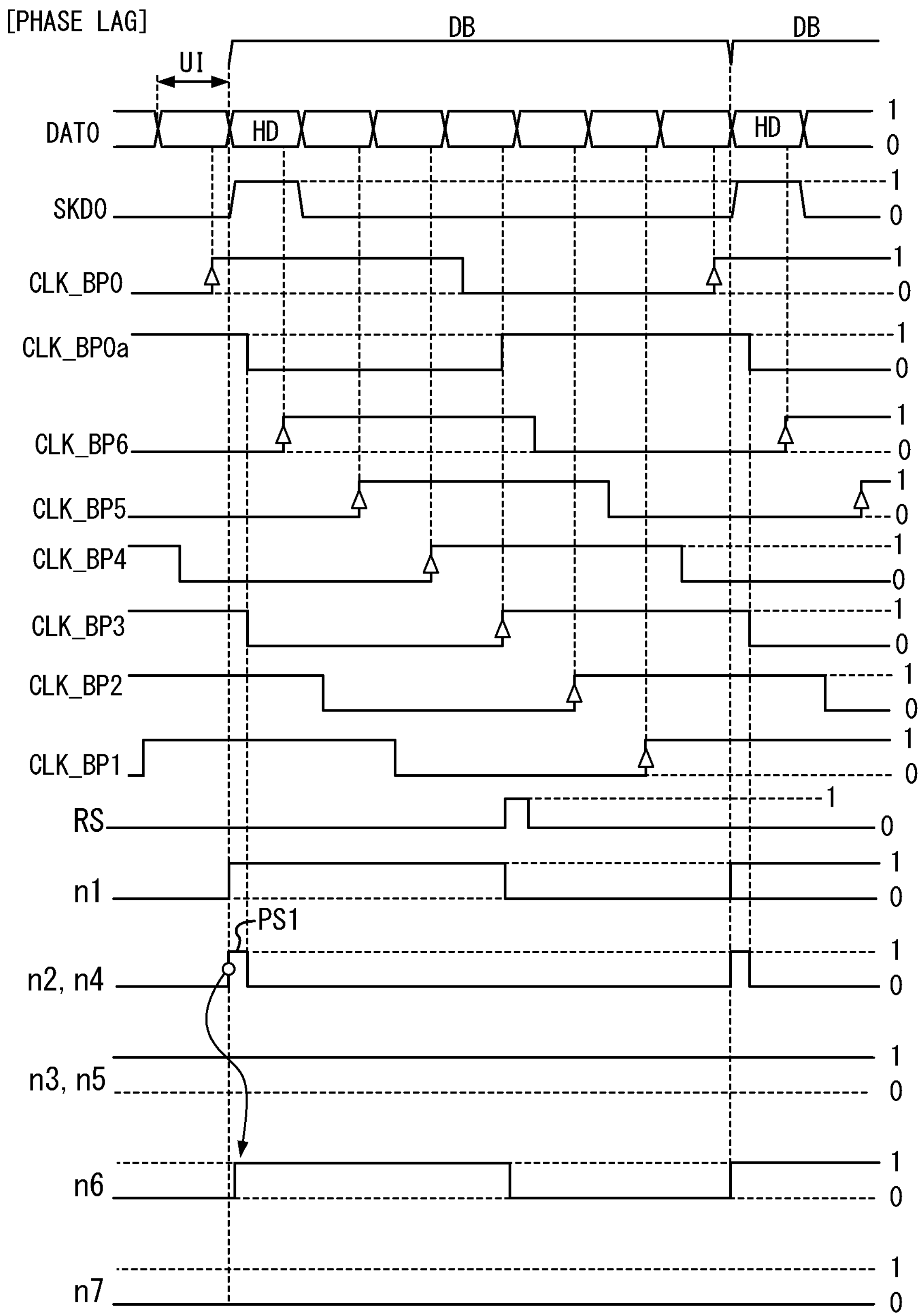
FIG. 9 is a timing chart illustrating an operation of the skew value control circuit 33 when the clock signal is in a state of a phase lag.

FIG. 9 is a timing chart illustrating the operation of the skew value control circuit 33 in a case where the clock signals CLK_BP0 to CLK_BP6 are in a state of the phase lag with respect to the serial data signal DAT0.

When in a state of the phase lag, as illustrated in FIG. 9, the timing of the rising edge of each of the clock signals CLK_BP0 to CLK_BP6 is a time point later than the center time point (UI/2) of each bit in the serial bit sequence [1, 0, 0, 0, 0, 0, 0] included in the data block DB of the skew adjustment data signal SKD0.

In this case, according to the head bit HD (logic level 1) of the data block DB of the skew adjustment data signal SKD0, first, the RS flip-flop SR1 outputs the leading edge portion detection signal n1 that transitions from the logic level 0 to the logic level 1. During this time period, as illustrated in FIG. 9, there is a section where both the judgement clock signal CLK_BP0*a* and the leading edge portion detection signal n1 are the logic level 1 immediately after the leading edge portion detection signal n1 transitions from the logic level 0 to the logic level 1 at the head portion of the data block DB. Thus, as illustrated in FIG. 9, the AND gate AN1 transitions from the logic level 0 to the logic level 1 over this section and outputs the phase lag detection signal n2 (n4) including a pulse PS1 that subsequently returns to the state of the logic level 0. Then, as illustrated in FIG. 9, the D flip-flop DF1 that has received this pulse PS1 at its clock terminal supplies the phase lag detection signal n6 of the logic level 1 indicating "with a phase lag" to the judgement circuit JD1.

Accordingly, according to this phase lag detection signal n6, the judgement circuit JD1 supplies the skew adjustment circuit 32 with the trimming signal TRM for changing the delay time currently selected at the skew adjustment circuit 32 to a delay time shorter than the delay time by one step. Thus, in the skew adjustment circuit 32, adjustment to shorten the delay time to be applied to the skew adjustment data signal SKD0 is performed. That is, in the skew adjustment circuit 32, skew adjustment that makes the phase of each of the clock signals CLK_BP0 to CLK_BP6 with respect to the skew adjustment data signal SKD0 proper is performed.

Figure 10:
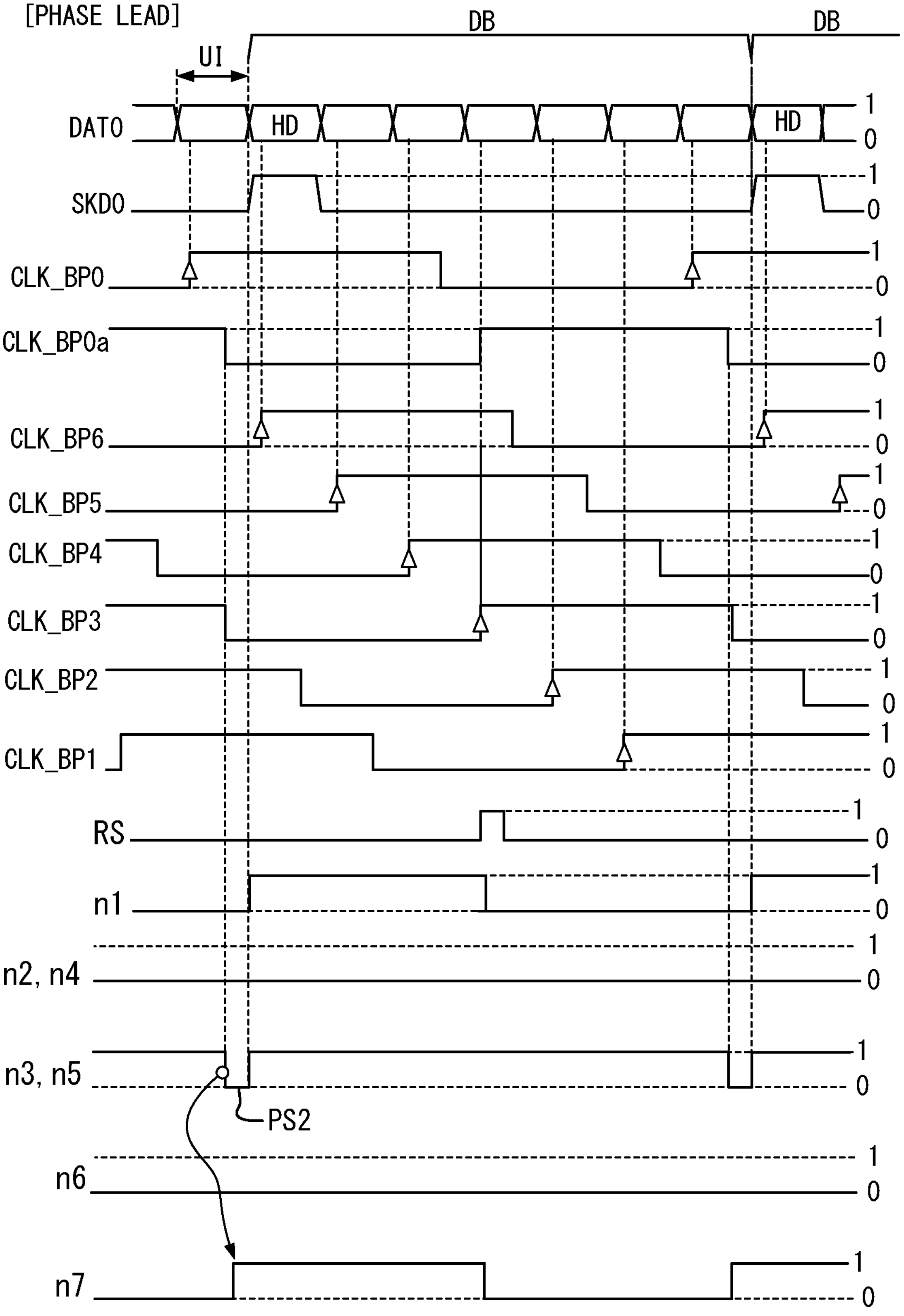
FIG. 10 is a timing chart illustrating an operation of the skew value control circuit 33 when the clock signal is in a state of a phase lead.

FIG. 10 is a is a timing chart illustrating the operation of the skew value control circuit 33 in a case where the clock signals CLK_BP0 to CLK_BP6 are in a state of the phase lead with respect to the serial data signal DAT0.

When in a state of the phase lead, as illustrated in FIG. 10, the timing of the rising edge of each of the clock signals CLK_BP0 to CLK_BP6 is a time point earlier than the center time point (UI/2) of each bit in the serial bit sequence [1, 0, 0, 0, 0, 0, 0] included in the data block DB of the skew adjustment data signal SKD0.

In this case, according to the head bit HD (logic level 1) of the data block DB of the skew adjustment data signal SKD0, first, the RS flip-flop SR1 outputs the leading edge portion detection signal n1 that transitions from the logic level 0 to the logic level 1. During this time period, as illustrated in FIG. 10, there is a section where both the judgement clock signal CLK_BP0*a* and the leading edge portion detection signal n1 are the logical level 0 immediately before the leading edge portion detection signal n1 transitions from the logic level 0 to the logic level 1 at the head portion of the data block DB. Thus, as illustrated in FIG. 10, the OR gate OR1 transitions from the logic level 1 to the logic level 0 over this section and outputs the phase lead detection signal n3 (n5) including a pulse PS2 that subsequently returns to the state of the logic level 1. Then, as illustrated in FIG. 10, the D flip-flop DF2 that has received this pulse PS2 at its inverted clock terminal supplies the phase lead detection signal n7 of the logic level 1 indicating "with a phase lead" to the judgement circuit JD1. According to this phase lead detection signal n7, the judgement circuit JD1 supplies the skew adjustment circuit 32 with the trimming signal TRM for changing the delay time currently selected at the skew adjustment circuit 32 to a delay time longer than the delay time by one step. Thus, in the skew adjustment circuit 32, adjustment to lengthen the delay time to be applied to the skew adjustment data signal SKD0 is performed. That is, in the skew adjustment circuit 32, the skew adjustment that makes the phase of each of the clock signals CLK_BP0 to CLK_BP6 with respect to the skew adjustment data signal SKD0 proper is performed.

As described in detail above, in the inside of the data receiving circuit 130, it is determined whether any of the phase lag or the phase lead is generated in the clock signals CLK_BP0 to CLK_BP6 for synchronizing the received serial data signal DAT0 (DAT1 to DAT3). Then, by adjusting the delay time to be applied to the serial data signal DAT0 (DAT1 to DAT3) based on the determination result, the skew adjustment for making the phase of each of the clock signals CLK_BP0 to CLK_BP6 with respect to the serial data signal DAT0 (DAT1 to DAT3) proper is performed.

Accordingly, according to the disclosure, since the skew adjustment is completed without intervention of a worker in a test before the product shipment, it is possible to reduce the cost and time required for the test.

In the above-described skew value control circuit 33, in the test before product shipment, by inputting the differential serial data signal DFS0 representing test data in which the head bit HD of the data block DB is the logic level 1, the RS flip-flop SR1 can be used as a leading edge portion detecting circuit for detecting the leading edge portion of the head bit HD. However, the leading edge portion detecting circuit is not limited to the RS flip-flop SR1 as long as it can detect the leading edge portion of the head bit HD.

While, in the above-described embodiment, a detection target of the leading edge portion is the head bit HD, the other 1 bit in the 7-bit serial bit sequence included in the data block DB illustrated in FIG. 4 may be the detection target of the leading edge portion. As a decision clock signal, instead of the decision clock signal CLK_BP0*a*, a clock signal that transitions from the logic level 1 to the logic level 0 at a time point advancing by a time of ½ of the bit cycle UI with respect to a clock signal for synchronization that transitions from the logic level 0 to the logic level 1 inside the bit cycle UI of this one bit is used as the decision clock signal.

Basically, it is only necessary that the data receiving circuit according to the disclosure, which receives the data signal (DAT0) including the serial bit sequence with the predetermined bit cycle (UI) and the reference clock signal (CK), is one that includes a clock generation circuit, a skew adjustment circuit, a leading edge portion detecting circuit, and a control circuit, which are described below.

A clock generation circuit (31), based on a received reference clock signal, generates a clock signal (CLK_BP0) that transitions from a state of a first level to a state of a second level within a bit cycle (UI) of 1 bit (HD) in a bit sequence included in a received data signal. Further, the clock generation circuit (31) generates a decision clock signal (CLK_BP0*a*) that transitions from the state of the second level to the state of the first level at a time point advancing by a time of ½ of the bit cycle with respect to the clock signal. A skew adjustment circuit (32) includes a delay circuit (SE1, SE2, B1 to B7) that can change a delay time and generates a skew adjustment data signal (SKD0) where skew relative to the clock signal is adjusted by delaying the received data signal (DAT0) through the delay circuit. A leading edge portion detecting circuit (SR1) detects a leading edge portion of the one bit (HD) included in the skew adjustment data signal and generates a leading edge portion detection signal (n1) that transitions from the state of the first level to the state of the second level at the time point of this leading edge portion. A control circuit (AN1, OR1, JD1) determines that the clock signal (CLK_BP0) is in a state of a phase lead and increases the delay time of the delay circuit when both the decision clock signal (CLK_BP0*a*) and the leading edge portion detection signal (n1) are in the first level. On the other hand, the clock signal is determined to be in a state of a phase lag and decreases the delay time of the delay circuit when both the decision clock signal and the leading edge portion detection signal (n1) are in the second level.

It is understood that the foregoing description and accompanying drawings set forth the preferred embodiments of the disclosure at the present time. Various modifications, additions and alternative designs will, of course, become apparent to those skilled in the art in light of the foregoing teachings without departing from the spirit and scope of the disclosure. Thus, it should be appreciated that the disclosure is not limited to the disclosed Examples but may be practiced within the full scope of the appended claims.

What is claimed is:

1. A data receiving circuit that receives a reference clock signal and a data signal including a serial bit sequence with a predetermined bit cycle, the data receiving circuit comprising:

- a clock generation circuit that generates a clock signal transitioning from a state of a first level to a state of a second level within the bit cycle of one bit in the bit sequence included in the received data signal and generates a decision clock signal transitioning from the state of the second level to the state of the first level at a time point advancing by a time of ½ of the bit cycle with respect to the clock signal, according to the received reference clock signal;
- a skew adjustment circuit that includes a delay circuit configured to change a delay time, the skew adjustment circuit generating a skew adjustment data signal where skew relative to the clock signal is adjusted by delaying the received data signal through the delay circuit;
- a leading edge portion detecting circuit that detects a leading edge portion of the one bit included in the skew adjustment data signal, the leading edge portion detecting circuit generating a leading edge portion detection signal that transitions from the state of the first level to the state of the second level at a time point of the leading edge portion; and
- a control circuit that determines that the clock signal is in a state of a phase lead and increases the delay time of the delay circuit when both the decision clock signal and the leading edge portion detection signal are in the first level and determines that the clock signal is in a state of a phase lag and decreases the delay time of the delay circuit when both the decision clock signal and the leading edge portion detection signal are in the second level.

2. The data receiving circuit according to claim 1, wherein the clock generation circuit generates a plurality of clock signals including the clock signal according to the reference clock signal, and each of the plurality of clock signals transitions from the state of the first level to the state of the second level within the bit cycle of each bit in the bit sequence included in the received data signal.

3. The data receiving circuit according to claim 2, further comprising

- a serial-parallel conversion circuit that outputs a plurality of bits retrieved by synchronizing each bit in the bit sequence included in the skew adjustment data signal with each of the plurality of clock signals as parallel data.

4. The data receiving circuit according to claim 1, wherein the leading edge portion detecting circuit includes an RS flip-flop that receives the skew adjustment data signal at an own set terminal thereof and outputs an output result thereof as the leading edge portion detection signal, and the control circuit includes:

- an AND gate that receives the leading edge portion detection signal and the decision clock signal at a first input terminal thereof and at a second input terminal thereof and outputs a phase lag detection signal indicating that the clock signal is in a state of the phase lag when both the leading edge portion detection signal and the decision clock signal indicate the second level; and
- an OR gate that receives the leading edge portion detection signal and the decision clock signal at a first input terminal thereof and at a second input terminal thereof and outputs a phase lead detection signal indicating that the clock signal is in a state of the phase lead when both the leading edge portion detection signal and the decision clock signal indicate the first level.

5. A display driver that drives a display panel having a plurality of display cells based on a video signal, comprising:

- a data receiving circuit that receives a reference clock signal and a video data signal including a serial bit sequence with a predetermined bit cycle and outputs a series of pixel data pieces constituted of parallel data each having a predetermined number of bits; and
- a DA conversion output unit that converts each of the pixel data pieces into a plurality of driving signals having voltages corresponding to luminance levels to output the plurality of driving signals to the display panel, wherein the data receiving circuit includes:

- a clock generation circuit that generates a clock signal transitioning from a state of a first level to a state of a second level within the bit cycle of one bit in the bit sequence included in the received video data signal and generates a decision clock signal transitioning from the state of the second level to the state of the first level at a time point advancing by a time of ½ of the bit cycle with respect to the clock signal, according to the received reference clock signal;
- a skew adjustment circuit that includes a delay circuit configured to change a delay time, the skew adjustment circuit generating a skew adjustment data signal where skew relative to the clock signal is adjusted by delaying the received video data signal through the delay circuit;
- a leading edge portion detecting circuit that detects a leading edge portion of the one bit included in the skew adjustment data signal, the leading edge portion detecting circuit generating a leading edge portion detection signal that transitions from the state of the first level to the state of the second level at a time point of the leading edge portion; and a control circuit that determines that the clock signal is in a state of a phase lead and increases the delay time of the delay circuit when both the decision clock signal and the leading edge portion detection signal are in the first level and determines that the clock signal is in a state of a phase lag and decreases the delay time of the delay circuit when both the decision clock signal and the leading edge portion detection signal are in the second level.

6. A display apparatus comprising:

a display panel having a plurality of display cells; and a display driver that drives the display panel based on a video signal, wherein the display driver includes:

a data receiving circuit that receives a reference clock signal and a video data signal including a serial bit sequence with a predetermined bit cycle and outputs a series of pixel data pieces constituted of parallel data each having a predetermined number of bits; and a DA conversion output unit that converts each of the pixel data pieces into a plurality of driving signals having voltages corresponding to luminance levels to output them to the display panel, wherein the data receiving circuit includes:

a clock generation circuit that generates a clock signal transitioning from a state of a first level to a state of a second level within the bit cycle of one bit in the bit sequence included in the received video data signal and generates a decision clock signal transitioning from the state of the second level to the state of the first level at a time point advancing by a time of ½ of the bit cycle with respect to the clock signal, according to the received reference clock signal;

a skew adjustment circuit that includes a delay circuit configured to change a delay time, the skew adjustment circuit generating a skew adjustment data signal where skew relative to the clock signal is adjusted by delaying the received video data signal through the delay circuit;

a leading edge portion detecting circuit that detects a leading edge portion of the one bit included in the skew adjustment data signal, the leading edge portion detecting circuit generating a leading edge portion detection signal that transitions from the state of the first level to the state of the second level at a time point of the leading edge portion; and a control circuit that determines that the clock signal is in a state of a phase lead and increases the delay time of the delay circuit when both the decision clock signal and the leading edge portion detection signal are in the first level and determines that the clock signal is in a state of a phase lag and decreases the delay time of the delay circuit when both the decision clock signal and the leading edge portion detection signal are in the second level.

* * * * *